United States Patent [19]

Sarnoff et al.

[11] 3,910,260

[45] *Oct. 7, 1975

[54] METHOD AND APPARATUS OF TREATING HEART ATTACK PATIENTS PRIOR TO THE ESTABLISHMENT OF QUALIFIED DIRECT CONTACT PERSONAL CARE

[75] Inventors: Stanley J. Sarnoff, Bethesda; Herbert E. Reinhold, Jr., Rockville, both of Md.

[73] Assignee: Survival Technology, Inc., Bethesda, Md.

[ * ] Notice: The portion of the term of this patent subsequent to Feb. 19, 1991, has been disclaimed.

[22] Filed: Nov. 21, 1973

[21] Appl. No.: 418,125

Related U.S. Application Data

[60] Division of Ser. No. 311,835, Dec. 4, 1972, abandoned, and a continuation-in-part of Ser. No. 230,753, March 1, 1972, Pat. No. 3,792,700.

[30] Foreign Application Priority Data

| | | |
|---|---|---|
| Feb. 13, 1973 | Israel | 41530 |
| Feb. 23, 1973 | Italy | 12475/73 |
| Feb. 23, 1973 | Argentina | 246777 |
| Feb. 26, 1973 | Belgium | 128115 |
| Feb. 28, 1973 | Spain | 412169 |
| Mar. 1, 1973 | France | 73.07259 |
| Feb. 14, 1973 | United Kingdom | 7301/73 |
| Feb. 21, 1973 | Australia | 52415/73 |
| Mar. 1, 1973 | Germany | 2310320 |
| Feb. 26, 1973 | Mexico | 141801 |
| Feb. 26, 1973 | Switzerland | 2779/73 |
| Mar. 1, 1973 | Netherlands | 7302874 |
| Feb. 23, 1973 | Canada | 164454 |
| Feb. 28, 1973 | Brazil | 149173 |
| Feb. 28, 1973 | Sweden | 7302820-1 |
| Feb. 28, 1973 | Japan | 48-24244 |

[52] U.S. Cl. .......... 128/2.06 R; 128/2.1 A

[51] Int. Cl. .......... A61b 5/04

[58] Field of Search .......... 128/2.05 R, 2.06, 2.06 R

[56] References Cited

UNITED STATES PATENTS

| | | | |
|---|---|---|---|
| 3,029,820 | 4/1962 | Franklin | 128/2.06 E |
| 3,426,150 | 2/1969 | Tygart | 128/2.06 R |
| 3,500,823 | 3/1970 | Richardson et al. | 128/2.06 E |
| 3,724,455 | 6/1970 | Unger | 128/2.06 A |
| 3,792,700 | 2/1974 | Sarnoff et al. | 128/2.06 R |

*Primary Examiner*—William E. Kamm

*Attorney, Agent, or Firm*—Cushman, Darby & Cushman

[57] ABSTRACT

A method of treating coronary prone individuals between the time that heart attack symptoms occur and qualified direct contact personal care can be administered which comprises providing each of a multiplicity of coronary prone individuals with (1) a plurality of separate medicaments, such as atropine and lidocaine, in self-administering form, such as automatic injectors, and (2) a portable battery operated device having a pair of electrodes shaped to fit within the armpits and means to provide auditory signals indicative of the existing heart beat conditions including signals corresponding to the electrical activity of the heart, establishing communication by telephone between any of the individuals experiencing heart attack symptoms and a source including a plurality of individuals available at all times at specific telephones having medical records of each of the individuals immediately available, including standing orders of each individual's doctor, and outgoing telephones for notifying the individual's doctor and next-of-kin and for dispatching an ambulance to the individual, positioning the electrodes within the armpits of the individual and communicating the signals thus provided to the qualified source by means of the established telephone communication, including transmitting thereover the electrical heart activity signals, receiving the signals and converting them to wave form oscilloscope pictures and electrocardiograms, communicating by means of the established telephone communication a qualified response determined from the information obtained at the source and administering responsive medicament to the individual at a time prior to the establishment of qualified direct contact personal care.

8 Claims, 6 Drawing Figures

METHOD AND APPARATUS OF TREATING HEART ATTACK PATIENTS PRIOR TO THE ESTABLISHMENT OF QUALIFIED DIRECT CONTACT PERSONAL CARE

This application constitutes a continuation-in-part of our application Ser. No. 230,753 filed Mar. 1, 1972, which issued Feb. 19, 1974 as U.S. Pat. No. 3,792,700, and a division of application Ser. No. 311,835 filed Dec. 4, 1972, abandoned and now pending as continuation application Ser. No. 488,434, filed July 15, 1974.

This application relates to the treatment of individuals suffering from a coronary heat attack and more particularly to improvements in the method and apparatus for such treatment disclosed in the method and apparatus for such treatment disclosed in Sarnoff application Ser. No. 55,647 filed July 17, 1970, abandoned and now pending as continuation application Ser. No. 296,841, filed Oct. 12, 1972.

In the above-mentioned commonly assigned Sarnoff application, there is disclosed a treatment of individuals suspected of suffering from a coronary heart attack (acute myocardial infarction) and more particularly a method of such treatment which is made available to coronary prone individuals experiencing heart attack symptoms at a time prior to the establishment of qualified direct contact personal care for the individual and apparatus for use in such method. The method of treatment and apparatus utilized therein was based upon the following considerations.

It has long been recognized that acute myocardial infarction is one of the greatest causes of death in the United States. It has also long been recognized that time is of the essence in successfully treating individuals undergoing acute myocardial infarction. Most hospitals have established coronary care units with equipment and personnel provided for the specific purpose of administering qualified personal care directly to the patient in the shortest time possible after delivery of the patient to the hospital. Despite the operation of such coronary care units, it is estimated that in the United States more than 300,000 people who sustain acute coronary heart attacks die before they reach a hospital each year, many of them in the first hour. In an effort to treat such individuals prior to hospital delivery, mobile coronary care units have been established in some high density population areas. These mobile units constitute, in essence, a hospital coronary care unit which can be brought directly to the patient so that qualified personal care can be administered as the patient is being transported to the hospital. During the course of the development of these mobile coronary care units, much of the diagnostic equipment necessary in treating myocardial infarction has been miniaturized and made more portable. Nevertheless, these mobile units are extremely costly to set up and maintain and, at best, do not provide the ultimate in time saving in that the time within which treatment can be administered is still dependent upon the time required to transport the qualified personal care into direct contact with the patient.

Thus, prior efforts to reduce the enormous death toll resulting from heart attacks have all recognized that reduction is not only dependent upon reducing the time lapse which takes place between the initial appearance of symptoms and treatment but that death reduction is almost in direct proportion to the reduction in the time lapse. The methods of time lapse reduction proposed and utilized prior to the development of the invention of the aforesaid Sarnoff application have all been directed toward minimizing the time required to effect the physical transportation between the means and personnel for administering personal care and the stricken individual, either by improved methods of rapidly transporting the victim to the personal care or the personal care to the victim. By following the principles of the invention as disclosed in the aforesaid Sarnoff application, the treatment of heart attack victims is, for the first time, divorced from the inherently time consuming necessity of effecting a physical transportation into direct contact between the means and personnel for administering personal care and the stricken individual. The achievement of this divorce, while relying upon the previous identification of potential heart attack victims as coronary prone and the placing of appropriate medication in the possession of such identified individuals, is much more complex than the practice heretofore known and used in identifying individuals hypersensitive to insect stings and providing such individuals with adrenalin to be self-administered immediately upon being stung if the individual exhibits signs and symptoms indicating that a hypersensitivity reaction is occurring.

With respect to the complexity of myocardial infarction treatment, it is known that ventricular fibrillation, a chaotic, uncoordinated, non-pumping contraction of the heart's ventricular muscle fibers figures prominently in producing sudden death in the prehospital phase. The mechanism which in turn precipitates ventricular fibrillation, either directly or indirectly, is generally accepted to be a ventricular ectopic beat (also called a premature ventricular contraction), an electrical impulse which arises in an abnormal or ectopic place. Such an ectopic impulse is therefore a trigger for the fatal event of ventricular fibrillation in sudden death prior to arrival in the hospital.

From the above, a key consideration in preventing a large number of coronary deaths before arrival in the hospital is the suppression of ectopic beats in the prehospital phase. Fortunately, medicaments are available which can importantly influence the incidence of ectopic beats and frequently suppress them entirely. The two most widely used medicaments at present are lidocaine and atropine. The latter medicament is also frequently helpful in correcting the varying degrees of heart block and the low blood pressure that sometimes accompanies an acute coronary heart attack. Such medicaments are in frequent use in hospitals and coronary care units for the purposes above described.

While lidocaine is generally useful in the suppression of ectopic beats, it is not advised when the heart rate is below a limit of 60 to 65 beats per minute because it has been observed that when the heart rate is below this level (bradycardia), the use of lidocaine may slow heart rate further if complete heart block is present. Atropine, on the other hand, is most useful at bradycardic rates below 60 to 65 per minute since it will elevate the heart rate, a maneuver observed to diminish or abolish the incidence of ectopic beats when bradycardia is initially present. The use of atropine when the heart rate is already quite elevated may be unwise.

In accordance with the disclosure of the aforesaid Sarnoff application, treatment without the lapse of the physical transportation time factor can be achieved by placing these medicaments in self-administering form in the possession of an identified coronary prone individual (a majority of the aforesaid fatalities fall into this category) and, in addition, providing such individual with the means for immediately making a qualified determination under the disconcerting circumstances presented as to which of the medicaments should be self-administered in view of his particular condition.

In the aforesaid Sarnoff application, the means disclosed is in the form of a portable battery operated heart monitoring device providing means activated by the simple, convenient procedure of inserting a finger in a finger-receiving structure on the device for sensing the blood pulses in the finger and rapidly and reliably producing an audible signal (in the form of a beep) for each pulse or beat of the heart. The monitoring device also included a plurality of different colored lights actuatable to indicate different heart beat frequency or rate ranges and circuitry for actuating the light corresponding with the rate of the heart beats sensed.

As disclosed in the aforesaid Sarnoff application, while the device is used by the individual, the qualified determination is preferably made by a doctor or a coronary care unit through instantaneous telephone communication based upon an evaluation of the existing coronary conditions of the victim (rate and rhythm) as supplied by the audible beep signals of the monitoring device. Under circumstances where telephone communications are not available, the device itself is used to indicate the determination by color coding the lights to the medicaments provided.

Aside from the far reaching consequences of the basic principles enunciated in the aforesaid Sarnoff application, the specific structures and procedures disclosed also embodied simplicity and convenience, both of which are of the essence in order to achieve practical success when dealing in the life or death situation of an individual in the throes of an acute heart attack. Within the framework of the essential need for simplicity and convenience, it was recognized at the time of the formulation of the basic principles of the aforesaid Sarnoff application, that the electrical activity of the heart could be converted into audible electrical signals capable of being transmitted over the telephone and of being converted at the place received into a wave form of the type produced by known ECG in-hospital equipment. See, for example, Tygart U.S. Pat. No. 3,426,150 and No. 3,426,151, both issued Feb. 4, 1969. It was also known that the information available from an ECG wave form, in addition to that provided by the rate and rhythm of the heart beat, would be useful in making the qualified determination as to medication. Nevertheless, the complexity and inconvenience of the known state of the art relating to electrical heart activity pickup was such as to offset the added informational advantages.

Some of the informational advantages of ECG wave form knowledge are set forth in the disclosure of Unger U.S. Pat. No. 3,724,455, where the problems of complexity and inconvenience presented to an individual under the throes of an acute heart attack are dealt with by providing for continuous pickup of the ECG wave form and automatic detection of herald signs long before recognizable symptoms become manifest. While this manner of dealing with the complexity and inconvenience problems, does tend to advance the medication determination to a point in time when the individual is not under the severe stresses of acute heart attack symptoms, the need to achieve continuous ECG wave form pickup presents problems of complexity and inconvenience of a different nature. The Unger patent disclosure does not deal with these problems of ECG wave form pickup but merely refers to properly placed electrodes. ECG wave form pickup electrodes have, of course, been fully developed for in-hospital use. In such use, however, the commplexity of application of the electrodes to the patient is assumed by hospital attendants and the inconvenience of continuous application is assumed as a part of the total inconvenience of being in any hospital. Whether the known in-hospital electrode technology could be successfully utilized to give a reliable continuous ECG wave form pickup under more or less normal living conditions is not evident from the present state of the in-hospital technology itself.

Just as the known in-hospital electrode technology does not seem sufficient to solve the continuous pickup problems of the Unger system, it does not provide adequate simplicity and convenience to insure reliable sensing of ECG wave form to produce the signals required of the system of the aforesaid application.

Accordingly, it is an object of the present invention to provide an improved apparatus and procedure which overcomes the problems noted above. In accordance with the principles of the present invention this objective is obtained by providing improvements in the apparatus and process of the aforesaid Sarnoff application in which the electrical activity of an individual suffering from heart attack symptoms is picked up by the simple procedure of placing electrodes within the individual's armpits. The arrangement is such that the electrodes reliably pick up the electrical heart signals for transmittal to circuitry where they are amplified and converted into audible signals which are then transmitted to a central source. At the source, the signals are received and converted into a wave form (either oscilloscope or electrocardiogram). The wave form is then used as a basis for the determination made at the source which is communicated to the stricken individual as a qualified response as to an indicated medicament to administer.

These and other objects of the present invention will become more apparent during the course of the following detailed description and appended claims.

The invention may best be understood in conjunction with the accompanying drawings wherein an illustrative embodiment is shown.

Figure 1:
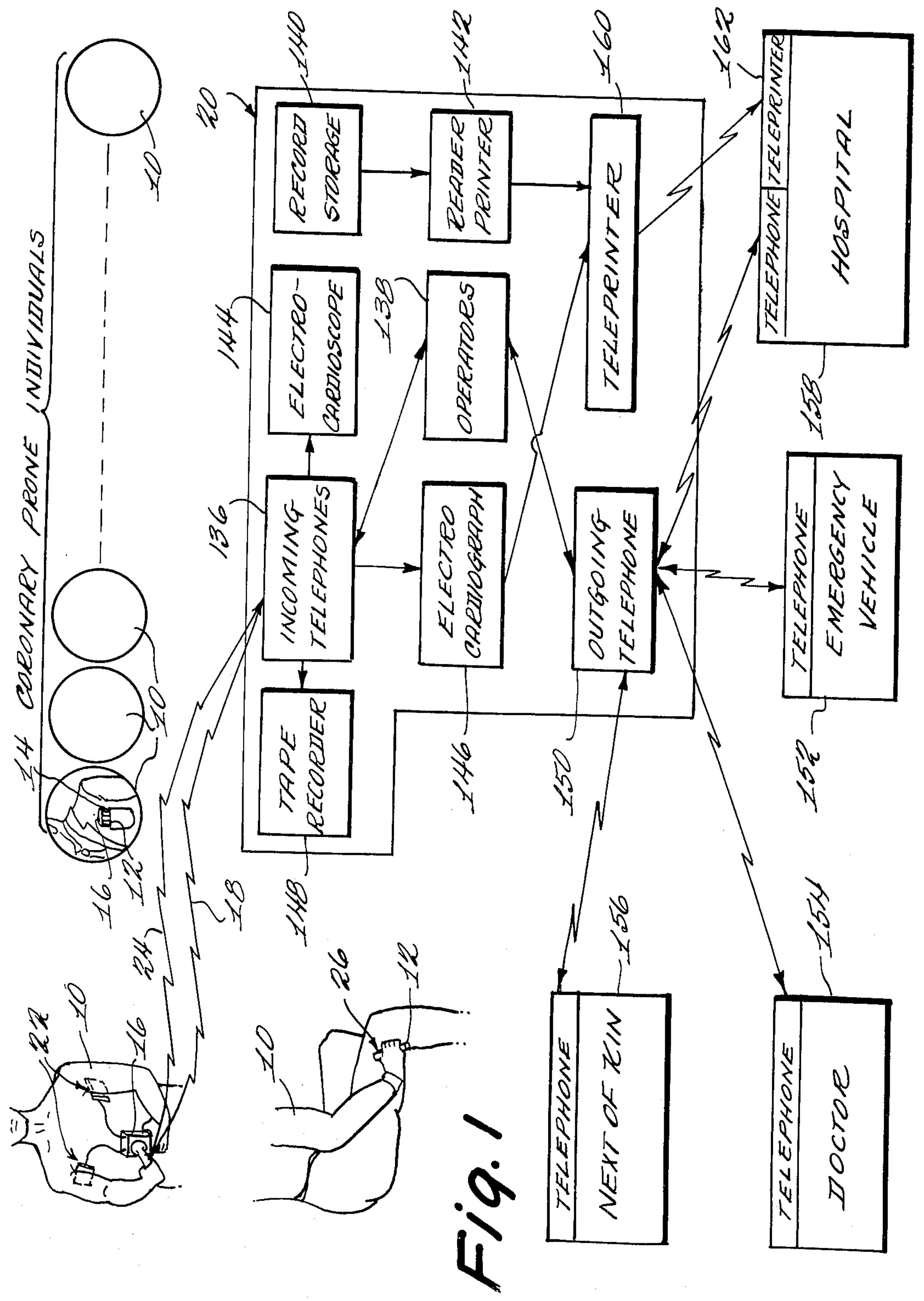
FIG. 1 is a schematic diagram exemplifying a preferred procedure for carrying out the steps of the present method.

Referring now more particularly to FIG. 1 of the drawings wherein the principles of the present invention are diagrammatically illustrated, the present method comprises the initial step of providing each of a multiplicity of coronary prone patients, schematically indicated at 10 in FIG. 1, with the following: (1) a plurality of separate medicaments, 12 and 14, in self-administering form, each of which when administered, (a) is generally effective to reduce the incidence of adverse cardiac conditions such as cardiac arrhythmias, when the existing heart beat condition is within a predetermined portion of the total range of heart beat conditions which may exist during an attack and (b) may be adversely effective when such heart beat conditions are outside the predetermined portion of the total range in which the medicament is effective as aforesaid, and (2) a device, generally indicated at 16 in FIG. 1, operable when disposed in operative relation to a patient to provide electromagnetic signals indicative of the existing heart beat conditions of the patient.

The next step in the present method occurs on the occasion of one of the aforesaid multiplicity of coronary prone patients 10 experiencing heart attack symptoms. When this occurs, the patient 10 establishes communication by telephone, as indicated at 18 in FIG. 1, with a source, generally indicated at 20 in FIG. 1, capable of making a qualified response based upon the existing heart beat conditions of the patient as to the medicament 12 or 14 which will be effective as aforesaid when administered. As soon as the telephone communication 18 has been established, the device 16 is then disposed in operative relation with the patient, as indicated at 22 in FIG. 1, and the signals thus provided by the device 16 are communicated to the qualified source 20 by means of the established telephone communication 18. Based upon the existing heart beat conditions of the patient, communicated to the source as aforesaid, the qualified source responds to the patient, as indicated at 24, through the established telephone communication indicating the medicament 12 or 14 which should be administered. Based upon the qualified response communicated to the patient, the indicated medicament 12 or 14 is immediately administered to the patient, as indicated at 26, at a time prior to the establishment of qualified direct contact personal care for the patient.

The provision of the medicaments 12 and 14 and the device 16 to each of the coronary prone patients is an essential step in the present method. These items, when combined to form apparatus in accordance with the principles of the present invention, provide the capability, when used as aforesaid, of obtaining the life saving results referred to above.

Figure 2:
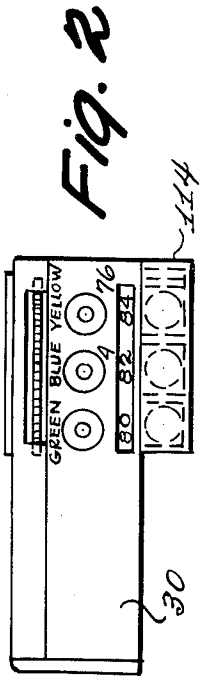
FIG. 2 is an elevational view of one form of apparatus used in carrying out the method exemplified in FIG. 1.

One embodiment of a combined apparatus which can be utilized in practicing the present invention is illustrated in FIG. 2. As shown, the apparatus is embodied in a common housing 30 which contains both the heart beat rate and rhythm signaling circuitry and the medicaments. This apparatus is similar to the apparatus described in detail in the aforesaid Sarnoff application Ser. No. 55,647, the disclosure of which is hereby incorporated by reference into the present specification, but is modified and supplemented in accordance with the principles of the present invention.

Figure 3:
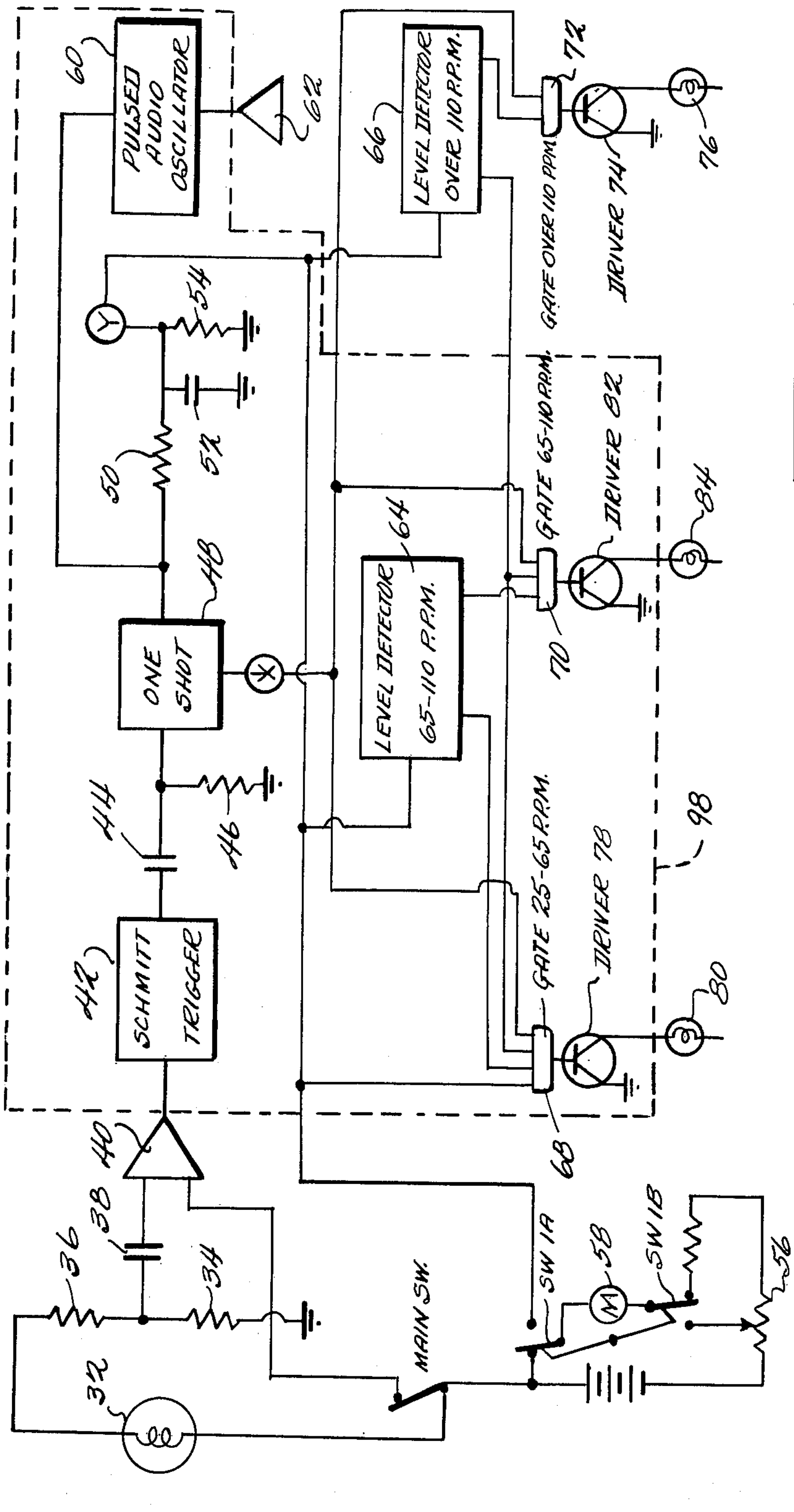
FIG. 3 is a schematic wiring diagram of the portable battery-powered device shown in FIG. 2.

Before undertaking to describe the modifications and additions it is first appropriate to describe the circuitry as disclosed in the aforesaid Sarnoff application which is schematically illustrated in FIG. 3 and includes a lamp 32 which illuminates the surface of the skin of the patient's finger when the device is disposed in operative relation to the patient. The quantity of light reflected from the skin varies in accordance with the quantity of blood present which in turn varies during each heart beat. This variation modulates a photosensitive resistor 34 which, together with resistor 36, forms a voltage divider. The AC component of the modulated voltage divider is transmitted through capacitor 38 to linear amplifier 40. The amplified output from 40 operates a Schmitt trigger 42 which gives a square wave front whenever the preselected trigger level is exceeded.

The output from Schmitt trigger 42 is differentiated by capacitor 44 and resistor 46 to trigger a one-shot multivibrator 48. The output of the one-shot multivibrator 48 thus releases a train of impulses of equal amplitude and duration whose frequency varies as the heart beat rate. This signal is integrated in the network comprising resistor 50, capacitor 52 and resistor 54 to provide a voltage at point Y which is a function of the heart beat rate.

In order to accurately measure the heart beat rate, the voltage at point Y is compared to the voltage across a calibrated potentiometer 56 by means of a null meter 58. Thus, when the meter 58 has been nulled by varying the potentiometer 56, the calibration of the potentiometer is such that it reads in heart beats per minute. The meter 58 is also employed to check the condition of the battery power supply by means of gang switch SW1A and SW1B in conjunction with the potentiometer 56. As shown in FIG. 3, the gang switch SW1A and SW1B is in the normal operating position wherein the potentiometer 56 and null meter 58 are in series with the remainder of the circuitry across the battery power source. When it is desired to check the battery, the gang switch SW1A and SW1B is moved to a position whereby the potentiometer and null meter are placed directly across the battery.

In order to provide a beep or other similar sound corresponding to the heart beat, one-shot multivibrator 48 is connected to pulsed audio oscillator 60 which is in turn connected to loud speaker 62 so that every signal from the one-shot multivibrator which represents a single heart beat will be made audible by the oscillator and loudspeaker.

An additional determination of heart beat rate within prescribed ranges of 25-65, 65-110 and over 110 pulses per minute (ppm) is made by means of the level detectors 64 and 66 and associated circuitry. More particularly the voltage appearing at points Y which is a function of the heart beat rate is connected to level detectors 64 and 66, AND gate 68 and gang switch SW1. At the same time, the one-shot multivibrator 48 is emitting at X a train of pulses whose frequency corresponds to the heart beat rate. This signal is continuously transmitted to AND gate 72, AND gate 70, and AND gate 68.

The operation of the pulse range band circuitry is as follows. When the voltage at point Y is such that a pulse rate of over 110 is indicated, level detector 66 will be actuated to send out a signal inhibiting AND gate 70 and AND gate 68. At the same time, a pulse signal from point X is received by all three AND gates 68, 70 and 72; however, AND gates 68 and 70 have been inhibited, thus only AND gate 72 is actuated. The AND gate 72 will energize driver 74 and in turn yellow lamp 76 will be energized indicating that the heart beat rate is over 110 ppm.

When the heart beat rate is between 65 and 110 ppm only level detector 64 will be actuated. This level detector will send out a signal inhibiting AND gate 68, thus only AND gate 70 will be operative. AND gate 70 upon receiving a signal from point X and level detector 64 will actuate driver 82 and thence blue lamp 84 to indicate that the heart beat rate is between 65 and 110 ppm. Lastly, when the heart beat rate is between 25 and 65 ppm neither level detector will be energized, thus the only AND gate to be actuated upon receiving signal from point X will be 68 which in turn actuates driver 78 and green lamp 80 to indicate that the heart beat rate is between 25 and 65 ppm.

As a matter of precaution to avoid the possibility of leaving the main switch on and perhaps depleting the battery power supply, the main switch has been incorporated in the sensing unit. Thus when the finger is placed in the sensing unit the main switch is operated to place the circuit in operative condition.

A device embodying the above described circuitry and mode of operation is advantageous because of its simplicity. By sensing the circulatory blood pulses in the finger, a minimum inconvenience is imposed upon the patient. By converting each pulse to a well-defined auditory signal or "beep" a clear indication of the existing heart beat rate and rhythm of the patient is provided which is capable of transmission over the established telephone communication in conventional fashion. Finally, by detecting the existing heart beat rate and selectively energizing one of a plurality of lights, each of which indicates a particular heart beat rate range, there is provided an instantaneous indication pertinent to the qualified response as to the proper medicament to be administered. Thus, in practicing the present invention it may be desirable for the patient to verbally communicate over the established communication, the color of the light which is being energized at each heart beat. Moreover, by color coding the medicaments in corresponding fashion to the lights, there is provided the capability of the patient utilizing the lighted color as a response to administer the correspondingly colored medicament in dire emergency situations where it is impossible or impractical to establish any telephone communication whatsoever, It can thus be seen that a device embodying the circuitry described above is operable when disposed in operative relation to a patient to provide electromagnetic signals indicative of the existing heart beat conditions of the patient. The electromagnetic signals provided are preferably within the auditory range since such signals are capable of direct transmission over conventional telephone circuits. Other signals capable of such transmission may be utilized which are either capable of telephone transmission by direct hook-up or by an appropriate conversion.

The disadvantage of the utilization of pulse sensing devices (whether sensed at the finger or other locations) is that they do not provide the capability of producing an electrocardiogram and the indications inherent therein which materially aid in formulating the response by the source 20. Accordingly, in practicing the principles of the present invention, a device 16 is utilized having circuitry which senses the electrical impulses of the heart and translates these impulses into electrical signals capable of transmission over the established telephone communication so that they can be converted into an ECG wave form. Such circuitry is known per se and one example thereof is disclosed in the U.S. Pat. to Tygart No. 3,426,150, the disclosure of which is hereby incorporated by reference into the present specification.

A particularly critical problem encountered in utilizing circuitry of this type is the reliability and simplicity of the electrodes used to pick up or sense the electrical impulses of the heart. What is needed is a sensing means which can be disposed in operative relation with the patient without the necessity of initially applying conductive pastes or the like to the patient's skin or elaborate means to maintain the electrodes in operative relation and still obtain a reliable sensing without excessive artifact. A preferred sensing means which meets this criteria is disclosed in our parent commonly assigned application Ser. No. 230,753, filed Mar. 1, 1972, the disclosure of which is hereby incorporated by reference into the present application.

Figure 5:
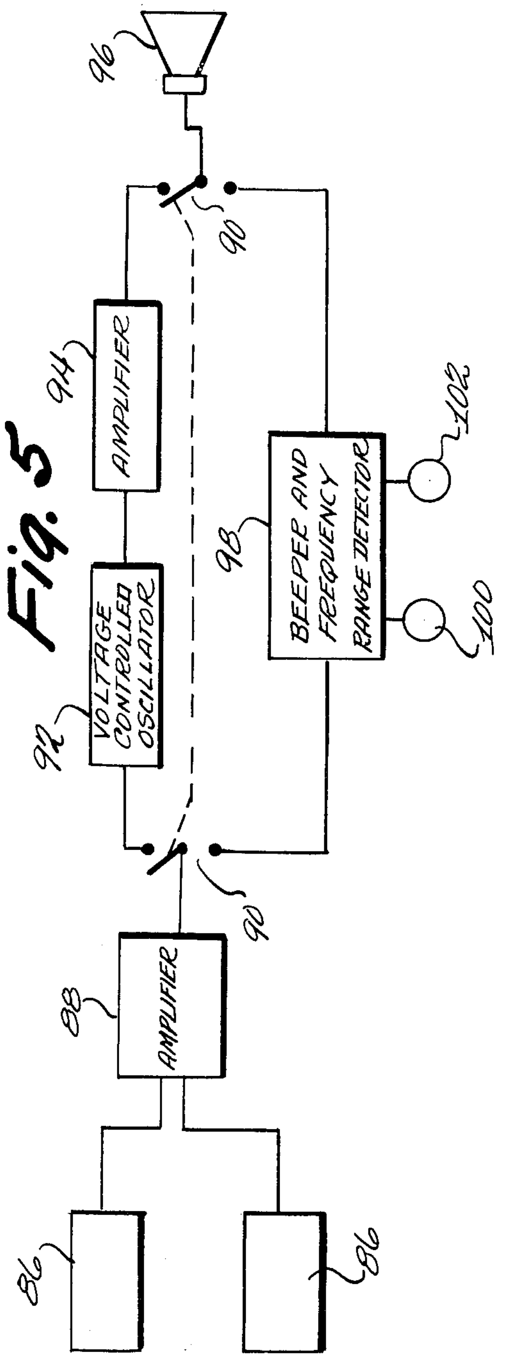
FIG. 5 is a block diagram of the circuitry embodied in the device of FIG. 4.

As best shown in FIG. 5, the sensing means is in the form of a pair of electrodes 86, each of which is made of carbon filled plastic, preferably a vinyl type, however, other types of plastic may be used. It will be understood that each electrode body is electrically connected with a suitable lead-in wire which is imbedded therein. The electrode bodies are shaped so that they can be conveniently placed within the armpits of the user. This construction and procedure satisfies the criteria stated above. First of all, with this electrode construction no conductive paste is needed. Thus all of the mess and bother attendant such is eliminated. Additionally, the plastic from which the body is made is generally inert. By this it is meant that there will be no chemical reaction between it and the skin of the user. Further, there will be no reaction from any moisture or oiliness that may be found on the user's skin. Still further, the electrode will not corrode and is readily cleaned so as to have a long use life. Also there will be no allergy problems.

The placing of the electrodes 86 in the armpits of the user presents many advantages. Specifically, the armpit area is warm and generally somewhat damp thus providing a very good area for transfer of weak electric signals. Additionally, there may be some type of salt or the equivalent present which would constitute an electrolyte and further enhance pickup of the signal. Further, the location of the electrodes in the armpits means that the electrodes will be in close proximity to the heart, thus a stronger signal should be received. It should also be noted that the stratum corneum on the armpit area is relatively thin thereby decreasing skin resistance. The type of flesh that the heartbeat signal passes through to reach the electrodes in the armpits presents less signal transmission difficulties than would be experienced in measuring heartbeat by signal take off on the lower arms or legs.

Figure 4:
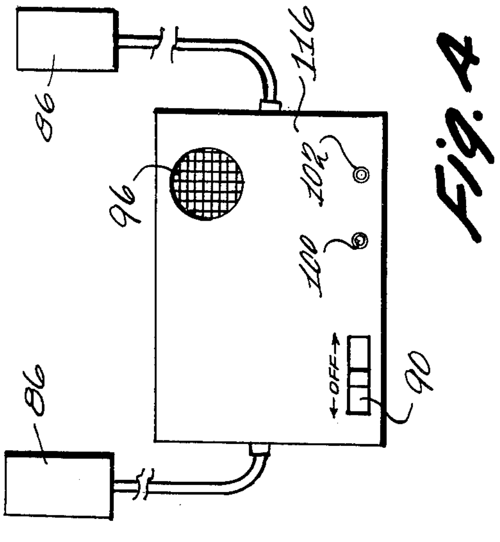
FIG. 4 is an elevational view of a preferred form of device.

In FIG. 4, there is disclosed a preferred device 16 which utilizes the sensing means of the aforesaid application and a circuit, shown schematically in block diagram in FIG. 5, which utilizes the beeper and frequency range light features advantageously employed in the circuit of FIG. 3, together with the further advantageous feature of electrocardiogram production, as with the Tygart circuit.

As best shown in FIG. 5, the circuit includes a pair of electrodes 86, constructed and operated in accordance with the disclosure of the aforesaid application Ser. No. 230,753. The relatively feeble voltages in the order of 1 millivolt or more, developed by the heart and picked up by the electrodes 86 are sent to an amplifier 88, the output of which is then conducted to a selector switch 90 of the three position type, the central position being an off power position. In one extreme position of the switch 90, the output of the amplifier 88 is conducted to a voltage controlled oscillator 92. The oscillator 92 (corresponding to Tygart's oscillator 13) is selected so that when no input voltage is present to be amplified by amplifier 88, the oscillator operates at a frequency within the range of audibility and preferably within that range of frequencies for which communications links used primarily for speech transmission are designed. The operating frequency of oscillator 92 is deviated from its normal value when a signal from amplifier 88 is applied thereto, so that the instantaneous frequency of the oscillator is a function of the voltage amplitude measured by the electrodes 86 applied under the armpits of the patient's body and thus, is a function of the operation of the heart.

The output of oscillator 92 is passed to an amplifier 94 and is then supplied to an electro-acoustic transducer or loudspeaker 96 under the control of switch 90.

When switch 90 is in its other extreme position, the output of the amplifier 88 is fed to a beeper and frequency range detector circuit 98 which includes the elements of the circuit of FIG. 3 enclosed within the broken line and indicated at 98.

In the preferred embodiment, only two frequency range lights (green) 100 and (orange) 102 are utilized and the single level detector (64) utilized is preferably set at 60 ppm and above. For purposes of the present method, the ECG circuit will normally be utilized, although the beeper and frequency range detector circuit and lights may be used in emergency situations, as aforesaid. Moreover, it will be understood that the ECG circuit may be expanded to include the calibration pulse generator and muting components of the Tygart circuit, if desired.

Where only two frequency ranges are utilized, as set forth above, the medicaments 12 and 14 are preferably atropine and lidocaine. Insofar as the self-administering form of the medicaments is concerned, they may be in any of the well-known self-administering forms appropriate for the particular medicament involved. In the specific examples of both lidocaine and atropine, the medicaments are in liquid form and are appropriately administered in such form by hypodermic injection. A preferred form of self-administration is to provide an appropriate dosage within an automatic injector of the type such as described in U.S. Pat. No. 2,832,339, the disclosure of which is hereby incorporated by reference into the present specification. It has been found in recent studies that injections of liquid medicaments with devices of this type into muscle tissue have a dispersion rate superior to that of a conventional hypodermic syringe when injected into muscle tissue. Moreover, while the present invention contemplates the utilization of conventional syringes for intravenous injection, the use of self-injecting devices of the type indicated above is preferable because of the simpler procedure involved in effecting self-administration as compared with conventional syringes particularly when administered intravenously.

An automatic injector is shown in detail in FIG. 5, the construction and operation of which will be apparent by reference to the aforesaid U.S. Pat. No. 2,832,339. For present purposes, it is sufficient to note that the automatic injector includes a housing 104 within which is contained an appropriate dosage of liquid medicament 106, such as atropine, a hypodermic needle 108 and means 110 for simultaneously effecting (1) a rapid movement of the needle 108 outwardly of the housing 104 into the muscle tissue of a patient and (2) a rapid movement of the liquid medicament 106 outwardly through the needle.

The movement effecting means 110 may take many forms and operate in any known fashion. In the preferred embodiment shown, operation is accomplished by the patient gripping the housing 104 and pushing a cap element 112 into an appropriate portion of the body having sufficient muscle tissue to receive the medicament, as for example, the thigh. as shown at 26 in FIG. 1.

The injector as shown is advantageous for several reasons, among which is the fact that the medicament can be safely stored therein for an extended period of time in a form which can be readily handled. Likewise, the needle is protected at all times and completely unexposed to the user until after injection has been accomplished. The operation is initiated by a simple act on the part of the patient and takes place so rapidly that injection of the medicament occurs, with the superior dispersion effect as aforesaid, without any anticipatory dread, as with an exposed needle. Moreover, injection can be accomplished through clothing, if necessary.

Figure 6:
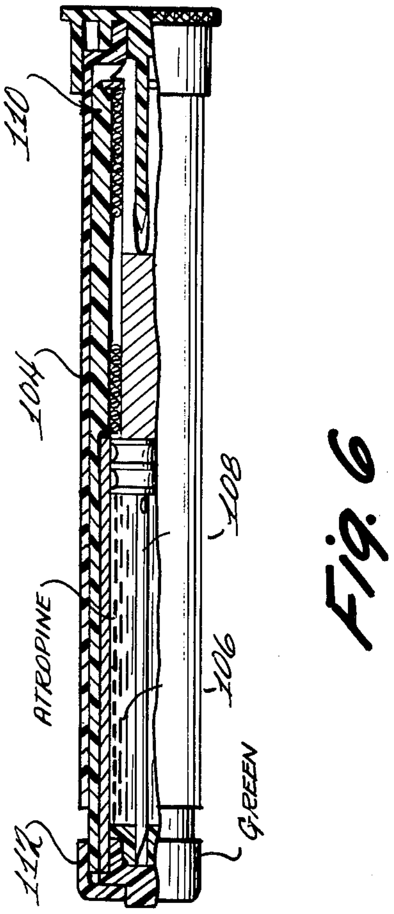
FIG. 6 is an elevational view partly in section of an automatic injector forming a part of the apparatus shown in FIG. 2 and used in conjunction with the device of FIG. 4.

Color coding of the medicament when contained within a self-injector is best accomplished by providing the appropriate color on the exterior of the injector, such as the housing 104 or end cap or both. In the case of the preferred apparatus, the injector containing atropine, as shown in FIG. 6, includes green coloring on the exterior thereof. A preferred manner of coloring would be to form the end cap 112 and/or housing of plastic material molded with a green coloring agent therein. The green coloring for the atropine injector is coded with the green light 100 which is energized by a heart beat at a rate below 60 pulses per minute. A similar injector containing lidocaine as the medicament and colored orange is coded to the orange light 102 which is energized by a heart beat at a rate above 60 pulses per minute.

With reference to FIG. 2, the apparatus of the present invention is contained within the common housing or casing 30, which is provided with a three compartmented receptacle 114 secured directly beneath the color coded lights 80, 84 and 76. Each compartment is provided with a medicament in a self-injector color coded to correspond to its compartment which is in turn color coded to correspond to the lights 80, 84 and 76. In this embodiment light 80 is shown as being colored green and the associated compartment and self-injector colored correspondingly green contains atropine, or the like, for use with a heart beat range of up to 65 ppm. The light 84 is colored blue and the associated compartment and self-injector colored correspondingly blue contains lidocaine, or the like, for use with a heart beat range of 65 to 110 ppm. The light 76 is colored yellow and the associated compartment and self-injector colored correspondingly yellow contains practalol, or the like, for use with a heart beat range of above 110 ppm.

With reference now to FIG. 4, the preferred device 16 is shown within a housing 116 separate from the auto-injectors containing the medicaments 12 and 14.

The housing 116 is of a size to easily fit within the breast pocket of a shirt or jacket and may be provided with conventional clips (not shown) for retention therein. Each auto-injector may likewise be provided with such clips (not shown) for storage within the pocket alongside the device 16 as clearly indicated in FIG. 1. With the pocket size device 16, the loudspeaker 96 is fixed within the housing 116, as shown in FIG. 4, and when the signals emitted therefrom are to be transmitted over the established telephone communication, the telephone receiver is simply held in a position adjacent the loudspeaker 96, as shown in FIG. 1. It will be understood, however, that a reel mounted loudspeaker may be utilized, as disclosed in the aforesaid Sarnoff application.

In addition to the above, it is within the contemplation of the present invention to provide each coronary prone patient 10 with an additional device (not shown) operable to measure and determine the patient's blood pressure. Conventional devices of this type may be provided as well as miniaturized devices of the type such as that disclosed in U.S. Pat. No. 3,103,214 dated Sept. 10, 1963. It will be understood, however, that the provision of blood pressure indicating devices, while desirable, is not essential to the practice of the present invention As previously indicated, the qualified source 20 may be simply the patient's doctor utilizing whatever telephone communication is utilized by him. However, it is preferable in accordance with the principles of the present invention that the sourcee be one which is at all times instantaneously available through a specific telephone communication. Such instantaneous and continuous availability is best provided in accordance with the principles of the present invention by providing a plurality of telephones, preferably of the type operable to automatically sequence to the next number in the event that the original number is not open. Preferably, the plurality of incoming telephones, indicated at 136 in FIG. 1, are disposed at a single qualified source station, indicated in the drawing by the block designated the source 20. The source 20 also includes sufficient personnel, indicated at 138, at the station at all times, 24 hours a day, available to establish the telephone communications 18 and 24 in the conventional fashion. The preferred source 20 also includes a patient record storage, generally indicated at 140, which contains information concerning each of the patients 10 including name, address, and telephone number, a medical history including such data as birth date, sex, etiology, anatomy, physiology, functional class, therapeutic class, blood pressure, and other pertinent medical data. The records also preferably include a listing of the patient's doctor, together with telephone numbers by which the doctor can be reached, a hospital where the patient would be treated in the event of a heart attack, and the telephone number of the hospital, an ambulance telephone number appropriate for the designated hospital, a designation of next-of-kin and the relationship with the patient, as well as the telephone number thereof, an indication of what current therapy the patient is undergoing and any drug allergies which the patient may have, plus standing orders of the patient's doctor as to which of the two medicaments 12 and 14 in the possession of the patient should be indicated to be administered, based upon the existing heart beat conditions of the patient. Finally, the records of the patient might include the most recent electrocardiogram with an indication of the date thereof.

The records may be stored in any fashion, one preferred mode of storage is to convert the written record to a microfilm image and to collect the microfilm images in a device capable of rapid retrieval at the source station. A specific example of such a device is the Mohawk Data Retriever. Where a device of this type is used, a microfilm reader-printer, generally indicated at 142 in FIG. 1, is also provided in order to permit the operator 138 at the source station to obtain a visual reading of the record. It will be understood that other types of record storage and retrieval may be utilized, including computer storage at remote locations with a read-out or printer at the source station.

The preferred source 20 also includes at the station a demodulating device (not shown) which is connectable with the telephone receiver for converting the audible signals, communicated thereto from the loud speaker 96 through the communication 18, into electrical signals of the type which will operate a conventional oscilloscope or electrocardioscope, indicated at 144 in FIG. 1. A specific example of a device of thhis type is produced under the trade name Physiocontrol Monitor (with cardiotachmometer). In addition, a demodulator device (not shown) is provided capable of converting the communicated signals into corresponding electrical voltage signals which are fed to a conventional electrocardiograph machine indicated at 146 in FIG. 1, as for example, a Cambridge Transrite 4–2. In regard to the demodulating devices, see Tygart U.S. Pat. No. 3,426,151, the disclosure of which is hereby incorporated by reference into the present specification. Optionally, a conventional tape recorded, indicated at 148 in FIG. 1 as for example a Phillips Pro 12, is likewise connected to the input telephone 136, for the purpose of recording the entire telephone communication 18 and 24.

It can be seen that the operator 138 at the source station by viewing the oscilloscope 144 and the records of the particular patient on the reader 142 and specifically the doctor's standing orders indicated thereon, can then provide the patient with a qualified response over the telephone communication 24 as to which of the plurality of medicaments 12 and 14 should be administered to the patient. It will be apparent, that the actual administering of the medicament to the patient, as shown at 26 in the drawings, can be performed by other individuals in the presence of the patient, as well as the patient himself.

In accordance with the principles of the present invention, it is preferable that the operators 138 of the source 20 also perform additional procedural steps which will materially aid in the continuing treatment of the patient after the administering of the indicated medicament has been accomplished. To this end, the plurality of telephones at the source station include one or more outgoing telephones, indicated at 150 in FIG. 1, by which an operator 138 at the station can establish communications with the operator of an ambulance or other emergency vehicle, such as a helicoptor or the like, as indicated at 152 in FIG. 1, so that such emergency vehicle will be dispatched to the patient as soon as possible for transportation to the designated hospital. Likewise, the outgoing telephones 150 are used by the operators 138 to notify the patient's doctor, as indicated at 154 in FIG. 1, and the patient's next-of-kin, as indicated at 156 in FIG. 1, all of which are indicated on the records as aforesaid. In addition, in order to eliminate any delay at the hospital, the telephones 150 may be used by the operators 138 to communicate with the hospital, as indicated at 158 in FIG. 1, whatever entrance information is required by the hospital, such information likewise being indicated on the records. Also, it is preferable in accordance with the principles of the present invention to provide both at the source station and at the hospital conventional teleprinting devices indicated at 160 and 162 in FIG. 1, which enable the operator to instantly transmit to the hospital both the patient's record as well as the electrocardiogram obtained from the electrocardiograph 146 during the communications 18 and 24 with the patient.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A method for effecting pre-hospital phase treatment of a coronary prone individual prior to the establishment of qualified direct contact personal care at a time during the early minutes or hours after the onset of heart attack symptoms and for enabling qualified personnel to participate by telephone in such treatment, which individual has previously been provided with ready access to (1) a plurality of separate injectors suitable for self-administration under the disconcerting circumstances present during the aforesaid time, each containing a liquid dosage of a different medicament injectable into the tissue of the individual effecting the self-administration of the injector, each of which medicaments (a) when so injected is generally effective to reduce the incidence of adverse cardiac conditions, such as ectopic beats, when the existing heart beat condition is within a different predetermined portion of the total range of heart beat conditions which may exist during an attack, and (b) may be inadvisable or unwise to inject when such heart beat conditions are outside the predetermined portion of the total range in which the medicament is effective as aforesaid, and (2) a diagnosing device including a pair of electrode bodies having exterior surface means for enabling the bodies to be easily positioned in the armpits of an individual and to be conveniently and confortably self-retained in such position solely by the individual by engagement between the adjacent arm portions and torso in the armpit areas and battery operated signal producing means operable when said electrode bodies are so positioned to provide signals indicative of the existing heart beat conditions of the individual, including signals capable of being transmitted by telephone representative of the electrical impulses which trigger the heart beats, said method comprising the steps of:

1. obtaining access to the aforesaid accessible device and injectors;

2. positioning said electrode bodies within the armpits of the individual and self-retaining the same therein solely by the individual by engagement of the bodies between the adjacent arm portions and torso in the armpit areas;

3. sensing through the operation of said electrode bodies while self-retained as aforesaid the electrical impulses which trigger the heart beats of the individual;

4. producing through the operation of said battery operated signal producing means signals indicative of the sensed heart beat conditions of said individual including a signal corresponding with each successive heart beat of said individual capable of being transmitted by telephone;

5. utilizing at least some of the signals produced as aforesaid as a basis for determining an indicated injector containing the medicament which is effective as aforesaid;

6. visually identifying the indicated injector containing the effective medicament as aforesaid, and

7. administering the identified injector containing the effective medicament and injecting said effective medicament into the tissue of said individual so that said injected medicament will reduce the incidence of adverse cardiac conditions, such as ectopic beats, in said individual prior to the establishment of qualified direct contact personal care for said individual.

2. A method as defined in claim 1 wherein said electrode bodies are positioned within the armpits of the individual with the exterior surface means of the electrode bodies in a dry condition.

3. A method as defined in claim 1 wherein the step of utilizing at least some of the signals for said determination comprises the steps of:

1. establishing communication by telephone between said individual and a source capable of making a qualified response including said determination based upon the existing heart beat conditions of said individual;

2. transmitting the aforesaid produced signals over the established telephone communication to said source, and

3. receiving over the established telephone communication a qualified response from said source including said determination.

4. A method as defined in claim 3 wherein said electrode bodies are positioned within the armpits of the individual with the exterior surface means of the electrode bodies in a dry condition.

5. A method as defined in claim 1 wherein the medicaments contained within the injectors include atropine and lidocaine.

6. A method as defined in claim 1 wherein the injection of the medicament is accomplished automatically by the injector during said administering step.

7. A method for effecting pre-hospital phase treatment of a coronary prone individual prior to the establishment of qualified direct contact personal care at a time during the early minutes or hours after the onset of heart attack sumptoms and for enabling qualified personnel to participate by telephone in such treatment, which individual has been previously provided with ready access to (1) at least one injector suitable for self-administration under the disconcerting circumstances present during the aforesaid time containing a liquid dosage of a medicament injectable into the tissue of the individual effecting the self-administration of the injector, which medicament (a) when so injected is generally effective to reduce the incidence of adverse cardiac conditions, such as ectopic beats, when the existing heart beat condition is within a predetermined portion of the total range of heart beat conditions which may exist during an attack, and (b) may be inadvisable or unwise to to inject when such heart beat conditions are outside the predetermined portion of the total range in which the medicament is effective as aforesaid, and (2) a diagnosing device including a pair of electrode bodies having exterior surface means for enabling the bodies to be easily positioned in the armpits of an individual and to be conveniently and comfortably self-retained in such position solely by the individual by engagement between the adjacent arm portions and torso in the armpit areas and battery operated signal producing means operable when said electrode bodies are so positioned to provide signals indicative of the existing heart beat conditions of the individual, including signals capable of being transmitted by telephone representative of the electrical impulses which trigger the heart beats, said method comprising the steps of:

1. obtaining access to the aforesaid accessible device and injector;
2. positioning said electrode bodies within the armpits of the individual and self-retaining the same therein solely by the individual by engagement of the bodies between the adjacent arm portions and torso in the armpit areas;
3. sensing through the operation of said electrode bodies while self-retained as aforesaid the electrical impulses which trigger the heart beats of the individual;
4. producing through the operation of said battery operated signal producing means signals indicative of the existing heart beat conditions of said individual including a signal corresponding with each successive heart beat of said individual capable of being transmitted by telephone;
5. utilizing at least some of the signals produced as aforesaid as a basis for determining that the injector obtained by said individual contains medicament which is effective as aforesaid;
6. visually identifying the injector containing the effective medicament, and
7. administering the identified injector containing the effective medicament and injecting said effective medicament into the tissue of said individual so that said injected medicament will reduce the incidence of adverse cardiac conditions, such as ectopic beats, in said individual prior to the establishment of qualified direct contact personal care for said individual.

8. Apparatus for effecting pre-hospital phase treatment of a coronary prone individual prior to the establishment of qualified direct contact personal care at a time during the early minutes or hours after the onset of heart attack symptoms and for enabling qualified personnel to participate by telephone in such treatment comprising the combination of:

a plurality of separate injectors suitable for self-administration under the disconcerting circumstances present during the aforesaid time, each including container means containing a liquid dosage of a different medicament and means for injecting said dosage into the tissue of the individual effecting the self-administration of the injector, each of which medicaments (a) when so injected is generally effective to reduce the incidence of adverse cardiac conditions, such as ectopic beats, when the existing heart beat condition is within a different predetermined portion of the total range of heart beat conditions which may exist during an attack, and (b) may be inadvisable or unwise to inject when such heart beat conditions are outside the predetermined portion of the total range in which the medicament is effective as aforesaid, and a diagnosing device including housing means for enabling the same to be easily and conveniently carried, a pair of separate electrode bodies, said electrode bodies having exterior surface means for enabling said bodies to be easily positioned in the armpits of an individual and to be conveniently and comfortably self-retained in such position solely by the individual by engagement between the adjacent arm portions and torso in the armpit areas, an elongated flexible lead element extending between each electrode body and said housing means, electrical conductor means operable when said electrode bodies are positioned and retained in the armpits of an individual as aforesaid, for establishing an electrical circuit within said housing means which extends therefrom through said lead elements and through said electrode bodies to the exterior surface means thereof and between the latter through the torso of the individual through which the electric impulses within the torso of the individual which trigger the heart beats of the individual are reliably conducted from the torso to said housing means, and battery operated electric circuit signal producing means carried by said housing means operable in response to the conducting of said electrical impulses through the aforesaid electrical circuit by said electrical conductor means to said housing means to amplify said electrical impulses and substantially suppress other electrical signals, such as artifact and the like, which may be conducted in said circuit, and to reliably produce output signals representative of the electrical impulses of the heart of the individual, the container means of said injectors and the housing means of said diagnosing device enabling a coronary prone individual to retain said injectors and device in a position of access substantially at all times so that during a time within the early minutes or hours after the onset of heart attack symptoms experienced by the individual access to said device can be obtained enabling said electrode bodies to be disposed within the armpits of the individual and said signal producing means to produce signals utilizable to provide an indication that an identifiable injector when administered is effective by virtue of the medicament injected therefrom to reduce the incidence of adverse cardiac conditions, such as ectopic beats, in the individual prior to the establishment of qualified direct contact personal care.

* * * * *